United States Patent [19]

Formaini et al.

[11] 3,919,144
[45] Nov. 11, 1975

[54] PRODUCTION OF POLYESTERS FROM TRIS(β-HYDROXYALKYL)ISOCYANURATE ALKYLENE OXIDE ADDUCTS

[75] Inventors: Robert L. Formaini, Millington; Edwin D. Little, Convent Station, both of N.J.

[73] Assignee: Allied Chemical Corporation, New York, N.Y.

[22] Filed: Sept. 27, 1974

[21] Appl. No.: 509,773

Related U.S. Application Data

[60] Division of Ser. No. 101,130, Dec. 23, 1970, Pat. No. 3,859,284, which is a continuation-in-part of Ser. No. 738,851, June 21, 1968, abandoned.

[52] U.S. Cl. ............ 260/20; 260/22 R; 260/75 N; 260/75 NM; 260/77.5 NC; 260/857 PA; 260/868; 427/117
[51] Int. Cl.² C08G 73/06; C08G 18/46; C08G 63/68
[58] Field of Search..... 260/75 N, 75 NM, 77.5 NC, 260/868, 857 PA, 857 PI, 22 R, 20

[56] References Cited
UNITED STATES PATENTS

| | | | |
|---|---|---|---|
| 3,088,948 | 5/1963 | Little | 260/248 NS |
| 3,211,585 | 10/1965 | Meyer | 260/75 NM |
| 3,312,645 | 4/1967 | George | 260/22 R |
| 3,342,780 | 9/1967 | Meyer | 260/77.5 NC |
| 3,361,593 | 1/1968 | Sattler | 260/22 R |
| 3,448,084 | 6/1969 | Burdick | 260/77.5 NC |
| 3,555,113 | 1/1971 | Sattler | 260/77.5 NC |
| 3,652,471 | 3/1972 | Sattler | 260/22 R |
| 3,660,327 | 5/1972 | Loncrini | 260/20 |
| 3,668,175 | 6/1972 | Sattler | 260/75 N |
| 3,683,048 | 8/1972 | Kolyer | 260/868 |
| 3,730,923 | 5/1973 | Formaini | 260/2.5 AQ |
| 3,763,269 | 10/1973 | Formaini | 260/77.5 NC |
| 3,763,276 | 10/1973 | Kolyer | 260/75 NH |
| 3,780,133 | 12/1973 | Kolyer | 260/75 NH |
| 3,793,250 | 2/1974 | Schmidt | 260/75 N |
| 3,825,619 | 7/1974 | Weedon | 260/77.5 NC |
| 3,856,718 | 12/1974 | Taub | 260/77.5 NC |
| 3,859,284 | 1/1975 | Formaini | 260/77.5 NC |

*Primary Examiner*—Donald E. Czaja
*Assistant Examiner*—C. Warren Ivy
*Attorney, Agent, or Firm*—Michael S. Jarosz

[57] ABSTRACT

Tris(2-hydroxyalkyl)isocyanurates are reacted with alkylene oxides to obtain tris(β-hydroxyalkyl)isocyanurate-alkylene oxide adducts, which can be polymerized with polycarboxylic acids. The resultant polyesters are useful as electrical insulating material in wire enamels and varnishes, casting resins, and for making ester-imide copolymers. High alkylene oxide-content isocyanurates are good functional fluids and lubricants.

13 Claims, No Drawings

PRODUCTION OF POLYESTERS FROM TRIS(β-HYDROXYALKYL)ISOCYANURATE ALKYLENE OXIDE ADDUCTS

This is a division of application Ser. No. 101,130 filed Dec. 23, 1970; which in turn is a CIP of application Ser. No. 738851 filed June 21, 1968 now abandoned.

BACKGROUND OF THE INVENTION

This invention relates to novel isocyanurates and polyesters derived therefrom; in particular it relates to tris β-hydroxyalkyl)isocyanurate-alkylene oxide adducts.

Tris(2-hydroxyethyl)isocyanurate and polyesters derived therefrom are known in the literature; for example, U.S. Pat. No. 3,088,948 to Little discloses tris(2-hydroxyethyl)-isocyanurate and its homologues, and Formaini application Ser. No. 443,655 filed Mar. 21, 1965, now U.S. Pat. No. 3,477,996 discloses polyesters derived therefrom using various dicarboxylic acids. However, the prior art does not provide a means of modifying the tris(2-hydroxyalkyl)isocyanurates to take advantage of varied physical and chemical properties.

SUMMARY OF THE INVENTION

The novel materials of this invention are tris(β-hydroxyalkyl)isocyanurate-alkylene oxide adducts of the formula

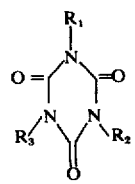

wherein $R_1$ is a hydrogen-terminated oxyalkylene chain of from 2 to 30 oxyalkylene units, and $R_2$ and $R_3$ are each a hydrogen-terminated oxyalkylene chain of from 1 to 30 oxyalkylene units. Each oxyalkylene unit has the formula

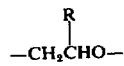

wherein R at each occurrence independently is hydrogen, methyl, or ethyl. The preferred compounds, derived from tris(2-hydroxyethyl)isocyanurate have the formula

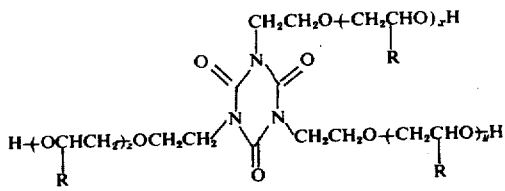

wherein R is as given above, x is an integer from 1 to 29, and y and z are each integers from 0 to 29.

The compounds of this invention are hereinafter referred to as hydroxyalkylated isocyanurates.

Polyesters derived from the instant hydroxyalkylated isocyanurates and a polycarboxylic acid are useful in wire enamels and varnishes, casting resins, and in the preparation of ester-imide copolymers. Hydroxyalkylated isocyanurates having a high oxyalkylene content, i.e. more than about 6 moles of alkylene oxide reacted per mole of tris(2-hydroxyalkyl)isocyanurate, are useful in lubricants, functional fluid applications, cosmetic creams and lotions, etc.

The instant hydroxyalkylated isocyanurates are prepared by reacting the corresponding tris(2-hydroxyalkyl)isocyanurate with an appropriate amount of alkylene oxide at elevated temperature, in the presence of an acid catalyst.

DETAILED DESCRIPTION OF THE INVENTION

Tris(2-hydroxyalkyl)isocyanurates of the formula

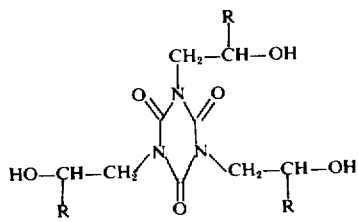

wherein R is hydrogen, methyl or ethyl, are readily prepared by procedures disclosed in aforesaid U.S. Pat. 3,088,948, wherein cyanuric acid is reacted with alkylene oxide.

The instant hydroxyalkylated isocyanurates may be prepared from the tris(2-hydroxyalkyl)isocyanurates by further acid-catalyzed reaction with alkylene oxide, which may be the same alkylene oxide originally reacted with the cyanuric acid or a different one.

The reaction may be conducted with or without a solvent, most conveniently without a solvent. For this latter procedure, the isocyanurate is heated to above its melting point and the alkylene oxide is bubbled through the molten material. In the case of tris(2-hydroxyethyl)isocyanurate a reaction temperature between about 134°C. (the melting point) and 180°C. is appropriate. Also, after the initial phase of the reaction, it is possible to lower the temperature below the melting point of the tris(2-hydroxyalkyl)isocyanurate since the melting point of the product is lower than that of the reactant. In conducting the reaction without a solvent, it is only necessary that the temperature be maintained high enough to afford a molten or fused reaction mixture. Of course, temperatures higher than the minimum may be preferred to increase the rate of reaction. The optimum temperature range for preparation of the various hydroxyalkylated isocyanurates of the invention can be easily determined by noting the minimum temperature necessary to maintain a molten mixture and the maximum temperature before the extent of side reactions becomes unacceptable.

The reaction is preferably conducted in an autoclave with pressure varying with the actual temperature and with the addition and consumption of the alkylene oxide, which is bubbled through the reactant as a gas or as a liquid under pressure.

The reaction can also be conducted with a solvent, which should be inert to the reactants and products at the temperatures employed. Solvents such as dimethylformamide should be avoided since they lead to the formation of oxazolidones from the reactant. Alcohols and glycols will react with the alkylene oxide. Among the inert solvents which are acceptable are trialkylisocyanurates, N-methylpyrrolidone, acetone, dimethyl ethers of polyethylene and polypropylene glycols, and dialkyl carbonates. The reaction is preferably conducted in an autoclave at the same reaction temperatures as are specified hereinabove for the fusion process. The pressure will vary with the temperature and as the alkylene oxide is added and consumed.

An etherification-type catalyst must be added to the reaction medium to obtain the hydroxyalkylated isocyanurates. These catalysts have high dissociation constants and produce a pH ranging between about 0 and 6. Examples of suitable catalysts include sulfuric acid, phosphoric acid, boron trifluoride and its hydrates and etherates, trichloroacetic acid, aromatic sulfonic acids such as benzenesulfonic acid and toluenesulfonic acid, and the like.

Although the quantity of catalyst may vary over a wide range it is preferred to employ the catalyst in an amount of about 0.5 to 2% by weight of the tris(2-hydroxyalkyl)isocyanurate. The amount of catalyst used must be sufficient to afford a controlled pH level.

The progress of the reaction may be followed by changes in pressure accompanying consumption of the alkylene oxide. Normally, the reaction is complete within 24 hours, although lower temperature, slow addition of alkylene oxide, etc. may require longer reaction times.

The properties of the hydroxyalkylated isocyanurate products will vary according to the amount of alkylene oxide incorporated. For example, as the oxyalkylene content of the product increases, the products change from low melting solids to liquids of decreasing viscosity over a limited range, and then back to low melting solids. When prepared without a solvent, the material is recovered by cooling and removal from the reaction vessel. When a solvent is employed in the reaction, recovery by distillation is convenient.

Normally, the reaction of tris(2-hydroxyalkyl)-isocyanurate with alkylene oxide will result in a symmetrical product, i.e., addition of 6 moles of oxide per mole of isocyanurate will afford a product with 2 oxyalkylene units adding to each hydroxyalkyl group of the reactant. However, oxyalkylene chains of differing lengths may be obtained in the same molecule by blocking one or two of the chains, building up the unblocked chains to the desired length, and then removing the blocking group. Blocking might be accomplished by esterification of the hydroxyl group with an acid which will not hydrolyze under the hydroxyalkylation conditions, by chlorination with thionyl chloride, etc.

The instant hydroxyalkylated isocyanurates can also be prepared by reacting cyanuric acid with at least a 4-fold molar excess of alkylene oxide under acidic conditions. This reaction is preferably conducted in a solvent inert to the cyanuric acid and alkylene oxide reagents, and the intermediate products. Solvents listed hereinabove for the reaction of tris(2-hydroxyalkyl)isocyanurates and alkylene oxide are suitable. Also, the catalysts listed hereinabove, which are strong organic and mineral acids, are suitable catalysts for this reaction.

The most preferred hydroxyalkylated isocyanurates are the reaction products of tris(2-hydroxyethyl)isocyanurate with an equimolar amount of ethylene oxide or propylene oxide, with a 3-fold molar excess, and with a 6-fold molar excess.

The hydroxyalkylated isocyanurates of this invention are useful for a variety of purposes, depending upon the alkylene oxide content of the particular compound. For example, compounds with a high level of alkylene oxide, i.e. greater than about 6 moles of alkylene oxide per mole of tris(2-hydroxyalkyl)-isocyanurate, are useful in lubricants, cosmetic creams and lotions, functional fluids for transmitting heat, pressure, etc., and in the synthesis of polyurethane foams and casting resins by reaction with diisocyanates, either with or without modifying diols and triols. In preparing these polyurethanes, standard catalysts such as tertiary amines can be used, and also conventional blowing agents if a cellular structure is desired.

Polyesters can also be prepared from the present hydroxyalkylated isocyanurates by reaction with polycarboxylic acids. Polyesters derived from those products of 1–6 moles of alkylene oxide per mole of tris(2-hydroxyalkyl)isocyanurate are preferred for their flexibility, adhesion, chemical resistance and dielectric properties, which make them valuable in wire enamels, varnishes, and in alkyd compositions.

Dicarboxylic acids which can be used in the preparation of polyesters include free polycarboxylic acids, acyl halides thereof, e.g. diacid chlorides, and their lower dialkyl esters. Mixed functional polybasic acids as well as anhydrides of the polycarboxylic acids can also be employed. Illustrative of the polycarboxylic acid reactants which can be employed are the benzene dicarboxylic acids, such as phthalic, isophthalic and terephthalic acids or their esters or anhydrides; succinic acid; adipic acid; sebacic acid; azelaic acid; maleic anhydride; fumaric acid; tetrahydrophthalic anhydride; the itaconic acids; endo-bis-5-norbornene-2,3-dicarboxylic acid; and isomers of methylbicyclo(2.2.1-)heptene-2,3-dicarboxylic acid. Preferably terephthalic or isophthalic acids are employed.

The polyesterification reaction can be most conveniently conducted by adding the polycarboxylic acid ingredient directly to the reaction kettle in which the hydroxyalkylated isocyanurate has been prepared, along with any modifying ingredients which may be desired according to considerations discussed hereinafter. However, the hydroxyalkylated isocyanurate can be isolated first if desired.

While a solvent can be used, normally the polyesterification reaction will be conducted without solvent for reasons of economy as well as ease of recovery. In the event that a solvent is employed, the solvent should be inert and form an azeotrope with water of condensation at a sufficiently high temperature, for example, toluene, xylene, and the like.

In making the polyester, at least about 95 equivalent percent of hydroxy reactant should be employed with respect to the amount of polycarboxylic acid reactant used, and preferably between about 100 and 120 equivalent percent of hydroxy reactant will be used. The amount of hydroxy reactant employed is specified herein in terms of equivalents since the alcohol and acid react on an equivalent basis rather than on a molar basis.

After addition of the polycarboxylic acid reactant, heating of the reaction mixture is continued at an elevated temperature between about 150°C. and 250°C. and preferably at about 200°–225°C., until the desired acid number is obtained. Usually the preferred products will have an acid number less than about 60, although higher acid numbers may be desirable depending upon molecular weight and end use criteria. The acid number of the polyester product, defined as the number of milligrams of potassium hydroxide required to neutralize one gram of sample, can be determined by procedures well known to those with skill in the art.

At this point, any solvent employed can be stripped off under vacuum, and the resulting mass cooled to afford the final polyester product. To obtain wire enamels the reaction mixture can be dissolved in cresylic acid or other appropriate solvents, and modified in appropriate manner to obtain superior enamel compositions.

While the hydroxyalkylated isocyanurates can be employed as the sole polyhydric alcohol in preparing the present polyesters, they can also be replaced in part by one or more other polyhydric alcohols. As little as about 5% by weight of the total polyhydric alcohol can be the hydroxyalkylated isocyanurate, but preferably at least about 20% by weight will be present. On an equivalent basis, preferably at least about 5% of the total polyhydric alcohol content will be the hydroxyalkylated isocyanurates.

Modifying polyhydric alcohols which can be employed are conventional and include ethylene glycol; glycerine; pentaerythritol, 1,1,1-trimethylolethane; 1,1,1-trimethylolpropane; sorbitol; mannitol; dipentaerythritol; $\alpha,\omega$-aliphatic hydrocarbon diols having 4 to 5 carbon atoms, e.g., butanediol-1,4; pentanediol-1,5; butene-2-diol-1,4; and butyne-2-diol-1,4; and cyclic glycols, e.g., 2,2,4,4-tetramethyl-1,3-cyclobutanediol, hydroquinone di beta hydroxyethyl ether and 1,4-cyclohexanedimethanol.

When a modifying polyhydric alcohol is used, it is preferably added to the initial polyesterification reaction mixture along with the other reactants. However, when the polycarboxylic acid is partially esterified with the hydroxyalkylated isocyanurate prior to further esterification with a modifying glycol, an excellent product is also obtained. Furthermore, when this two-step process is modified by employing cresylic acid during the esterification an excellent composition is obtained.

The glycols which can be used advantageously in the latter two-step process can vary widely. In general they are glycols conventionally used in preparing polyesters, including alkylene glycols of the formula HO(X)OH wherein X is alkylene, generally of 2 to 10 carbon atoms, such as ethylene glycol, propylene glycol, butylene glycol, neopentyl glycol, 2-methyl-1,3-pentanediol, 1,5-pentanediol, hexamethylene glycol and the like; and ether glycols of the formula HO $(XO)_x(X)$ OH wherein X is as given above and x is an integer from 1–10, such as diethylene glycol, dipropylene glycol, tripropylene glycol, triethylene glycol, tetramethylene glycol and the like. Alkylene glycols are preferred.

The flexibility of insulated coatings prepared from the instant polyesters can be improved by preparing a high functionality polyester and, separately, a low or intermediate functionality polyester and then blending the two together to form a solution of both which is used to coat electrical conductors. By employing such blends the excellent properties of heat shock and thermal stability or thermal life are obtained in combination with a surprising and significant improvement in flexibility.

The high functionality or extensively cross-linked polyester resins are derived from reaction of a diacid reactant with the hydroxyalkylated isocyanurate. Small amounts of dihydroxy compounds can be included, but the amount must be limited so that the functionality or cross-linking is not significantly diminished. The amount of dihydroxy compound can be as high as about 10% of the amount of hydroxyalkylated isocyanurate used. Satisfactory dihydroxy compounds include such compounds as ethylene glycol; 1,4-butanediol; neopentyl glycol; 1,5-pentanediol; 1,6-cyclohexanedimethanol; 2,2,4,4-tetramethyl-1,3-cyclobutanediol; propylene glycol; and 4,4'-bis(hydroxymethyl)diphenyl ether.

The lower functionality polyester is also derived from the above ingredients, but with the equivalent percent of dihydroxy compound approximately equal to the equivalent percent of the hydroxyalkylated isocyanurate.

It is often desirable to use more than a single polycarboxylic acid ingredient in the instant polyester composition. In particular, when the main polycarboxylic acid ingredient is an aromatic acid, for example terephthalic or isophthalic acid, the aromatic component can be partially replaced by an aliphatic dibasic acid to provide improved flexibility to the composition during heat aging. Among the aliphatic dibasic acids which can be used are adipic acid, succinic acid, glutaric acid, pimelic acid, malonic acid, azaleic acid, sebacic acid, the Diels-Alder adduct of maleic acid and hexachlorocyclopentadiene, chlorendic anhydride and 2,5-endomethylene tetrahydrophthalic anhydride. Adipic acid is preferred. The aliphatic dibasic acid can be substituted for the aromatic dibasic acid in an amount between about 20–60 mole percent of total acid content, preferably between about 25–40 mole percent.

The polyesters of the instant invention may be advantageously employed for a variety of purposes. For example, they can be used in industrial coatings, laminates, films, electric insulators, especially as wire enamels or varnishes, as well as in making molded articles. In solution, they can be used to impregnate cloth, paper, asbestos and the like. They can also be employed in general wherever alkyd resins are useful.

The solvent employed in making a wire enamel is preferably cresylic acid. Cresylic acid has a boiling range of 185°C. to 230°C. and is a mixture of o-, m- and p-cresols. The individual cresols, e.g., para-cresol, meta-cresol or ortho-cresol can be employed, although it is preferred to use the commercial cresylic acid mixture. Other solvents which can be used individually or in admixture with cresylic acid are phenol, xylene, toluene, naphtha and the like.

When used in wire enamel compositions, the instant polyesters may have added thereto small amounts of metal driers to improve the physical properties of the enamel. The metal drier is preferably used in an amount of 0.1 to 1.0% of metal based on the total solids in the enamel. Typical metal driers include the zinc, lead, calcium or cadmium linoleates, naphthenates, octoates, and resinates, such as zinc resinate, cadmium resinate, lead linoleate, calcium linoleate, zinc naphthenate, lead naphtheante, calcium naphthenate, cadmium naphthenate, zinc octoate, and cadmium octoate. Other suitable metal driers, such as polyvalent metal driers including manganese naphthenate and cobalt naphthenate, can also be employed.

The properties of the polyesters of the invention can also be improved for wire enamel and similar purposes by the addition of a polyisocyanate in an amount up to about 40%, preferably 0.1–15% by weight of the total of polyisocyanate and polyester. Preferably the polyisocyanate will have at least three available isocyanate groups although diisocyanates can be used.

Illustrative of the polyisocyanates which can be employed are diisocyanates such as 2,4-tolylene diisocyanate; 2,6-tolylene diisocyanate; cyclopentylene diisocyanate; m-phenylene diisocyanate; p-phenylene diisocyanate; ethylene diisocyanate; butylidene diisocyanate; 1,5-naphthalene diisocyanate; 1,6-hexamethylene diisocyanate; dianisidien diisocyanate; 4,4'-diphenyl ether diisocyanate and the like; triisocyanates such as triphenyl methane triisocyanate (Desmodur R); the cyclic trimer of 2,4-tolylene diisocyanate; the cyclic trimer of 2,6-tolylene diisocyanate; mixtures of the cyclic trimers of 2,4-tolylene diisocyanate and 2,6-tolylene diisocyanate; the trimer of 4,4'-diphenyl methane diisocyanate; other trifunctional isocyanate trimers having the formula:

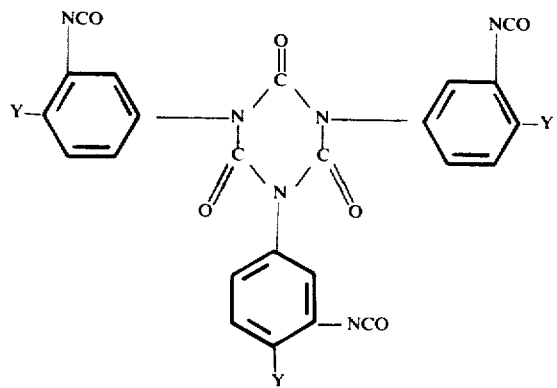

wherein Y is a lower alkyl radical, e.g., n-butyl, tertiary butyl, secondary butyl, isopropyl, ethyl, and the like; 1,3,5-triisocyanato benzene, 2,4,6-triisocyanato toluene; 2,4,4'-triisocyanato diphenylmethane; 2,4,6-triisocyanato diphenyl ether; 2,2,2',4-triisocyanato diphenyl ether; 2,2',4-triisocyanato diphenyl sulfide; 2,4,4'-triisocyanato diphenyl sulfide; 2,3',4-triisocyanato-4'-methyl diphenyl ether; 2,3',4-triisocyanato-4'-methoxy diphenyl ether; 2,4,4'-triisocyanato-3'-chloro diphenyl ether; 4,4',6-triisocyanato biphenyl; 1,2,4-triisocyanato butane; 1,3,3-triisocyanato pentane, 1,2,2-triisocyanato butane, phloroglucinol triisocyanate; the reaction product of 3 mols of 2,4-tolylene diisocyanate with 1 mol of trimethylol propane, the reaction product of 3 mols of 2,6-tolylene diisocyanate with 1 mol of trimethylol propane, the reaction product of 3 mols of 2,4-tolylene diisocyanate with 1 mol of trimethylol propane, the reaction product of 3 mols of 2,4-tolylene diisocyanate with 1 mol of trimethylol ethane and, in general, the reaction product of a diisocyanate with sufficient polyhydric alcohol to react with half the isocyanate groups. Polyfunctional isocyanates such as 4,4'-dimethyl-2,2',5,5'-tetraisocyanato diphenyl-methane can also be employed.

While the polyisocyanates can be used as such, particularly where pot life is not important, it is preferred to block the isocyanate groups with a group that will split off at the reaction temperature employed with the polymeric ester. Typical compounds which can be used to block the isocyanate groups, e.g., by forming carbamates therewith, are monohydric phenols, such as phenol, meta-cresol, para-cresol, ortho-cresol and mixtures thereof; 2,6-dimethyl phenol, 4-ethyl phenol, 4-tertiary, butyl phenol, 2-butyl phenol, 4-n-octyl phenol, 4-isooctyl phenol, 2-chloro phenol, 2,6-dichloro phenol, 2-nitro phenol, 4-nitro phenol, 3-nitro phenol, mono-α-phenylethyl phenol, di-α-phenylethyl phenol, tri-α-phenylethyl phenol, 2-methyl-5-isopropyl phenol, thymol and the like; monohydric alkanols such as methyl alcohol, ethyl alcohol, n-propyl alcohol, isopropyl alcohol, tertiary butyl alcohol, tertiary amyl alcohol, octyl alcohol, stearyl alcohol and the like; hydroxyalkylcarbamic acid aryl esters such as hydroxyethylcarbamic acid phenyl ester, hydroxyethylcarbamic acid cresyl ester and the like; mercaptans, such as e.g., 2-mercaptobenzothiazole, 2-mercaptothiazoline, dodecyl mercaptan, ethyl 2-mercaptothiazole, p-naphthyl mercaptan, α-naphthyl mercaptan, methyl mercaptan, butyl mercaptan and the like; lactams such as ε-caprolactam, Δ-valerolactam, α-butyrolactam, β-propiolactam and the like; imides such as succinimide, phthalimide, naphthalimide, glutarimide and the like; secondary amines such as o-ditolylamine, m-ditolylamine, p-ditolylamine, diphenyl amine, N-phenyl toluidine, phenyl-α-naphthylamine, carbazole, diphenylamine, 2,2'-dinitrodiphenylamine, 2,2'-dichlorodiphenylamine and the like; carbinols such as methyl diphenyl carbinol, dimethylphenyl carbinol, dimethyl ethinyl carbinol, triphenyl carbinol, nitro tertiary-butyl carbinol, chloro-tertiary-butyl carbinol and the like; esters such as acetoacetic acid ester, diethyl malonate, ethyl benzyl malonate, ethyl n-butyl malonate, and the like; and compounds such as triphenyl silanol, acetyl acetone, acetonyl acetone, 1-phenyl-3-methyl-5-pyrazolone, and the like.

As specific examples of such blocked polyisocyanates, there may be mentioned Mondur S, wherein the isocyanate groups of the reaction product of 3 moles of mixed 2,4- and 2,6-tolylene diisocyanate with trimethylolpropane are blocked by esterification with phenol, and Mondur SH, wherein the mixed cyclic trimers of 2,4- and 2,6-tolylene diisocyanates have the three free isocyanate groups blocked by esterification with m-cresol.

Unless otherwise stated hereinafter in the specification and claims, it is understood that whenever the term "polyisocyanate" is employed, it is intended to include both the free isocyanates and the blocked isocyanates.

The polyisocyanate is mixed with the preformed polyester, either dry or dissolved in a solvent prior to mixing. The reaction between the polyester and the polyisocyanate is hastened by using elevated temperatures and in preparing wire enamels they are preferably reacted at a temperature of about 650°–800°F.

It has further been found that the properties of the polyester wire enamels of the invention can be improved by incorporating a titanate in place of the metal drier and polyisocyanate. Typical tetra-alkyl titanates include tetraisopropyl titanate, tetrapropyl titanate, tetrabutyl titanate, tetraamyl titanate, tetrahexyl titanate, tetraethyl titanate, tetramethyl titanate and diisopropyl dibutyl titanate. Carbocyclic aryl titanates can also be employed such as tetraphenyl titanate, tetra cresyl titanate (made from any of the cresol isomers alone or in admixture with each other) and tetraxylenyl titanate. The titanate is used in small amounts, e.g., 0.01%, to 4.0%, based on the total solids in the wire enamel.

Additional conventional modifying agents can be used in connection with the instant polyesters. For example, monocarboxylic acids, either saturated or unsaturated, fatty acids, glyceryl esters, also known as drying oils, natural resins such as rosin, copals and ester gums, aldehyde resins formed from urea, triazine and melamine, modified if desired with an alcohol, phenol-aldehyde resins, novolak resins, such as aniline-aldehyde resins, terpenes, Diels-Alder addition products, unsaturated alcohols such as allyl alcohol, vinyl copolymers, epoxide resins such as the reaction product of epichlorohydrin and bis(4-hydroxyphenyl)dimethylmethane silicone resins, cellulose acetate resins, polyamide resins such as nylon type resins, resins such as styrene-butadiene copolymers modified with maleic anhydride, and polyamines such as phenylene diamine, methylene dianiline and the like, can be added in known manner.

To improve the physical characteristics of a modified insulating composition, it is often helpful to employ a triazine curing agent, for example, a melamine-aldehyde resin or a modified melamine-aldehyde resin such as one modified with an alkylating agent such as an alcohol or its equivalent. Such modified polyesters may contain between about 1% and 20% by weight of a melamine-formaldehyde resin (or alcohol-modified melamine-formaldehyde resin) based on the polyester. Preferably, the resin will be present in an amount between about 3% and 10% by weight, with or without curing agents such as metal catalysts.

Other triazines which can be employed for this purpose include benzoguanamine, formoguanamine, acetoguanamine, lauroguanamine, stearoguanamide, propioguanamine, melamine, and the like. Preferably, the triazine is a guanamine, most preferably benzoguanamine. The alkylated melamine-aldehyde resins have better flexibility and heat resistance than the corresponding melamine-aldehyde resins. While there can be employed various aldehydes such as formaldehyde, acetaldehyde, propionaldehyde and furfural, the preferred aldehyde is formaldehyde.

As the alkylating agent there can be used methyl alcohol, ethyl alcohol, propyl alcohol, isopropyl alcohol, butyl alcohol, secondary butyl alcohol, amyl alcohol, hexyl alcohol, cyclohexyl alcohol, octyl alcohol, isooctyl alcohol, 2-ethyl-hexanol and the like. The preferred alcohol is butyl alcohol.

The preferred modified triazine resin is butylated benzoguanamine-formaldehyde. Other suitable triazine resins include methylated benzoguanamine-formaldehyde, ethylated benzoguanamine-formaldehyde, propylated benzoguanamine-formaldehyde, sec-butylated benzoguanamine-formaldehyde, amylated benzoguanamine-formaldehyde, cyclohexylated benzoguanamine-formaldehyde, octylated benzoguanamine-formaldehyde, isooctylated benzoguanamine-formaldehyde, butylated benzoguanamine-acetaldehyde, butylated benzoguanamine-furfural, amylated formoguanamine-formaldehyde, hexylated acetoguanamine-formaldehyde, butylated acetoguanamine-formaldehyde, butylated lauroguanamine-formaldehyde, heptylated stearoguanamine-formaldehyde, butylated melamine-formaldehyde, and butylated N,N-dimethyl-melamine-formaldehyde.

Use of a phenol-formaldehyde resin as modifying agent in the polyester materials will often afford improved flexibility, heat aging and mandrel after snap properties. As the phenol-formaldehyde resin there can be used heat reactive condensation products of formaldehyde with phenols such as phenol, o-cresol, m-cresol, p-cresol, mixed cresols, e.g., cresylic acid, xylenol, diphenylol propane, p-butylphenol, p-amylphenol, p-octylphenol, and p,p'-dihydroxy-diphenyl ether. Obviously mixtures of phenols can be used as indicated above.

These phenol-formaldehyde resins are preformed in a conventional manner prior to addition to the polyester.

Modifying the instant polyester with fatty acids and/or oils, for example, of long, medium, or short oil content, provides insulating varnishes especially useful for impregnating armature and field coils of motors and for both power and distribution transformers of either the oil or dry type where long life at high operating temperatures is required. These varnishes provide maximum penetration in the tightest wound coils. They are particularly suitable for impregnating motor stators, rotors, and other electrical equipment.

Representative fatty oils which can be used for this purpose are included the non-drying, semi-drying, and drying fatty oils, including vegetable oils and animal oils, marine oils and treated marine oils, such as soya, cottonseed, hydrogenated cottonseed, linseed, castor, hydrogenated castor, dehydrated castor, coconut, tung, oiticica, menhaden, hempseed, grapeseed, corn, codliver, candlenut, walnut, perilla, poppyseed, safflower, conjugated safflower, sunflower, rapeseed, Chinawood, tristearin, whale, sardine, herring, oils and the like. Instead of using these oils, it should be understood that for the purposes of the present invention fatty acids or mixtures of fatty acids which make up the fatty oils or their equivalents can be employed.

Representative monocarboxylic acids including fatty acids are illustrated by the following: abietic acid, benzoic acid, caproic acid, caprylic acid, castor fatty acid, coconut fatty acid, cottonseed fatty acid, crotonic acid, DCO FA, i.e. primarily $CH_3(CH_2)_5CH=CH-CH=CH-(CH_2)_7COOH$, 2-ethylhexanoic acid, lauric acid, linoleic acid, linolenic acid, linseed FA, oleic acid, pelargonic acid, rosin acid (A.N. 165), soya FA, tall oil FA (A.N. 195, A.N. 192), and the like.

It is preferable that an oil-soluble resin, such as a phenol-aldehyde resin, be added to these oil-modified polyester compositions. Among the oil-soluble phenol-aldehyde resins which can be used are p-tertiary-amylphenol-formaldehyde; p-tertiary-butylphenol-formaldehyde; p-tertiary-octylphenol-formaldehyde; p-phenylphenol-formaldehyde; bis(4-hydroxyphenyl)-dimethylmethane-formaldehyde and o-tertiary-butylphenol-formaldehyde. Substituted phenols alone or in conjunction with phenols can be used in forming the oil-soluble phenolic resin.

The oil-soluble phenol-formaldehyde resins are of the heat-reactive type, and are usually employed in an amount of 10% to 80% by weight of the total of the oil modified polyester and phenolic resin, preferably 20–30%. Increasing the amount of phenolic resin speeds the cure but also sacrifices aging characteristics. Hence, the amount of phenolic resin is preferably kept at about 20% by weight. It is also possible to eliminate the phenolic resin from the varnish with resulting loss of the advantages of having the phenolic resin present, or to replace part of the phenolic resin with other heat-reactive resins, e.g., furane resins, triazine resins, urea-formaldehyde resins, melamine-formaldehyde resins, and epoxide resins, although the preferred heat-reactive resins are the phenolic resins since they impart the best combination of properties. Rosin-modified phenolics are also advantageously employed.

The oil-modified polyester resins can be further modified by employing various other resins in conjunction therewith. Included among such resins are phenolic resins including resins produced from phenol and substituted phenols, including difunctional, trifunctional, and tetrafunctional phenols, naphthols, and bisphenols, such as phenol-sulfur resins; phenol-acetylene resins; phenol-terpene resins; phenol-terpene-aldehyde resins; phenol-naphthalene-aldehyde resins; phenol-urea-formaldehyde resins; phenol-aniline-formaldehyde resins; phenol-glycerol resins; and the like; non-phenolic resins having the necessary labile or reactive hydrogen including urea and substituted urea-aldehyde resins; sulfonamide-aldehyde resins; melamine-aldehyde resins; polycarboxy-polyamine resins; resins derived by ring hydrogenation of phenolic resins; and the like.

In addition to the resin components, the insulating varnish also includes one or more solvents, such as xylene, mineral spirits, naphtha, toluene, and the like.

Substituting an effective amount of hydroxyalkylated isocyanurate for a portion of the polybasic alcohol content of an alkyd composition affords improvement to properties such as impact resistance, hardness and gloss, as well as improving the curing rate. For example, substituting the hydroxyalkylated isocyanurate for about 5–50 mole percent of glycerol in an alkyd composition has been found to be effective. Particularly useful for baking enamel purposes are alkyd resins comprising the reaction product of glycerol, at least one polycarboxylic acid, an oily modifier component, and an effective amount of an hydroxyalkylated isocyanurate.

Oily modifier components which are suitable include those fatty oils and acids listed hereinabove with regard to oil-modified polyesters. In addition, these oil-modified alkyds can be advantageously blended with an amino resin for improved curing, for example the various melamine-based resins listed hereinabove with regard to modified polyesters.

Insulating wire enamels containing polyesters derived from the hydroxyalkylated isocyanurates of the invention, either unmodified or modified in any of the variety of ways discussed hereinabove, are applied to various electrical conductors and other components according to standard procedures well known to those skilled in the art.

Coated conductors with improved properties such as flexibility, heat resistance and abrasion resistance, are obtained by modifying the coating and the manner in which it is applied in accordance with generally familiar considerations, for example by providing multiple coatings of varying composition. In this manner, it is often desirable to provide the electrical conductor with a first continuous coating of the instant polyester compositions, either modified or unmodified, and a second continuous coating of polyethylene terephthalate.

For other applications it may be desirable to provide the electrical conductor with a continuous inner dielectric coating of a non-linear thermosetting resin and a thin, uniform, continuous outer dielectric coating of a non-linear branched polyester composition of the instant invention. This configuration will often permit reduction of the number of coatings required to eliminate heat shock and thermal shock without detracting from the desirable qualities of the insulation.

These and other coating configurations known in the art can be used with the instant polyesters to afford superior insulation of electrical conductors.

Use of an unsaturated polycarboxylic acid in preparing polyesters from the hydroxyalkylated isocyanurates affords compositions suitable for laminates, casting resins, etc. For this purpose an appropriate cross-linking monomer is added to the composition, e.g., styrene, α-methylstyrene, methyl methacrylate, diallyl phthalate, triallylisocyanurate, triallylcyanurate, ethylene glycol dimethacrylates and homologs thereof, diethylene glycol divinyl ether, alkyl vinyl ethers, alkyl acrylates, and the like.

The choice of cross-linking monomer will depend in part upon the desired characteristics and properties of both the polyester and final product to be fabricated therefrom. For example, if it is desirable to use a high level of hydroxyalkylated isocyanurate or unsaturated acid, in preparing a polyester, in order to impart certain physical or chemical properties to the product, the most advantageous monomer will vary from styrene to styrene-methyl methacrylate mixture or diallyl phthalate. The selection of cross-linking agent will be influenced in these instances by considerations such as solubility, shelf life of the compound, and properties desired in the cured product. In particular, the use of diallyl phthalate in place of styrene or styrene-methyl methacrylate mixture improves elevated temperature strength retention of the product.

The amount of cross-linking monomer employed will vary according to the end use of the product, but generally cross-linking monomer concentrations between about 20% and 70% by weight will give products useful for casting and laminates. Preferably, the cross-linking monomer concentration will be between 30% and 60%.

In addition to the cross-linking monomer, unsaturated polyesters will also contain a suitable vinyl polymerization initiator or catalyst for the cross-linking, and optionally a promoter. Among the initiators which can be used are peroxides, such as benzoyl peroxide, di-t-butyl peroxide, dicumene peroxide, and methylethyl ketone peroxide; hydroperoxides such as t-butyl hydroperoxide; azo compounds such as azo-bis-isobutyronitrile and azo-bis-valeronitrile; and the like. Catalytic amounts of the initiator, e.g., 0.2–2% by weight are used. Useful promoters include naphthenates and alkanoates of cobalt, lead, manganese, and calcium.

It has also been found that copolymerizing the polyesters of hydroxyalkylated isocyanurates with a polycarboxylated imide affords an ester-imide polymer with superior electrical insulating qualities.

The imide ring-containing compound can be formed as is known by reacting (a) an aromatic carboxylic anhydride which, in addition to a 5-membered anhydride ring, contains at least one further reactive site, e.g., a carboxyl group, a carboxylic anhydride group or a hydroxyl group, and (b) a primary amine containing at least one further reactive group, e.g., a carboxyl a hydroxyl or an additional primary amino group. The anhydride group of the aromatic carboxylic compound can be replaced with two adjacent carboxyl groups, or the esters, semiesters or semiamides thereof. The free primary amine can be replaced with its salt, amide, lactam or polyamide so long as the substituted primary amino group is capable of forming an imide.

Among the aromatic carboxylic compounds which can be used are pyromellitic anhydride, trimellitic anhydride, naphthalene tetracarboxylic dianhydrides and dianhydrides of tetracarboxylic acids containing two benzene nuclei wherein the carboxyl groups are in the 3,3'- and 4,4'-positions.

Examples of primary amino compounds which can be used are the aliphatic primary diamines, e.g., ethylene diamine, tetramethylene diamine, hexamethylene diamine, and nonamethylene diamine; and aromatic diprimary diamines, e.g., benzidine, diaminodiphenyl methane, diaminodiphenyl ketone, or the corresponding sulfone, sulfoxide, ether and thioether, phenylene diamine, tolylene diamine, xylylene diamine, as well as diamines containing three benzene nuclei, e.g., bis-(4-aminophenyl)-α, α'-p-xylene or bis-(4-aminophenoxy)-1,4-benzene; and also cycloaliphatic diamines, e.g., 4,4'-dicyclohexylmethane diamine. Amino alcohols can be used, e.g., monoethanolamine, monopropanolamines or dimethylethanolamine, as well as aminocarboxylic acids, e.g., glycine, aminopropionic acids, aminocaproic acids, or amino-benzoic acids.

The ester-imide resins thus afforded provide superior lacquers for coating electrical wires, which stand up well to thermal shock.

It is understood throughout that among the modifying alcohols which can be advantageously employed in the polyester compositions are tris(2-hydroxyalkyl)isocyanurates, which are trihydric alcohols. These products can be used in any proportion with the hydroxyalkylated isocyanurate compounds in making up the basic polyester, and can also be added to the polyester in the same manner that other trihydric modifying alcohols are added to the polyester compositions.

The following examples are provided to more fully illustrate the present invention. They are provided for illustrative purposes only and are not meant to be construed in any way as limiting the scope of the invention, which is defined by the appended claims. In the examples, % is by weight. Viscosities were determined using a Brookfield viscometer at 24°C.

EXAMPLE I

Preparation of hydroxyethylated isocyanurates

Into a 300 ml. stainless steel autoclave, which was provided with a stirrer, was charged tris(2-hydroxyethyl)isocyanurate (75 g., 0.29 mol), which had been recrystallized from methanol, and 0.8 g. of concentrated sulfuric acid. The mixture was heated to 135 °C. to obtain fusion, and then liquid ethylene oxide was added under nitrogen pressure. The reaction temperature was maintained at 134°-140°C. and the pressure ranged between 10 and 60 psig. The progress of the reaction was followed by the drop in pressure. After 2–3 hours, the reaction mixture was cooled and 152 g. of clear, viscous material was removed from the autoclave, indicating that 77 g. of ethylene oxide (1.75 mole) had reacted, to afford tris(hydroxyethyloxyethyloxyethyl)isocyanurate of the formula:

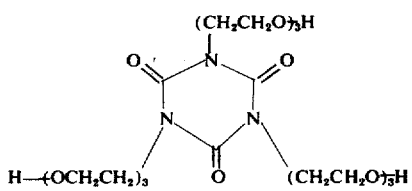

The product had a viscosity > 100,000 cps and pH of 5. The structure was confirmed by infrared analysis.

EXAMPLE II

The procedure as in Example I was followed except charging 100 g. tris(2-hydroxyethyl)isocyanurate and 57 g. ethylene oxide.

The product had the formula

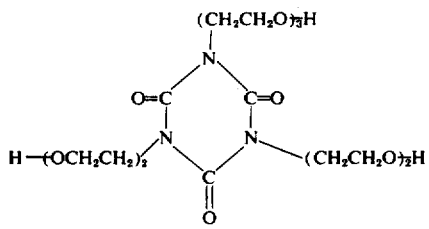

The product had a hydroxy content of 13.0%, pH of 4 and viscosity of > 100,000 cps.

EXAMPLE III – V

The procedure of Example I is repeated wherein tris(2-hydroxyethyl)isocyanurate is reacted with an equimolar amount of ethylene oxide, a 30-fold excess and an 87-fold excess of ethylene oxide. The resultant products have the formula

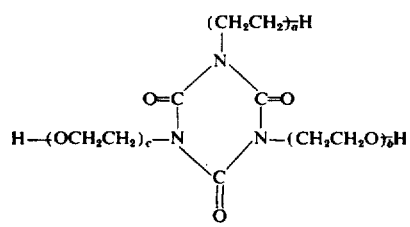

wherein a, b, and c are 2,1,1; 11,11,11; and 30,30,30 respectively.

EXAMPLE VI

Tris(2-hydroxyethyl)isocyanurate (300 g.) and 1.5 g. of concentrated sulfuric acid were charged to an autoclave as in Example I. A small amount of propylene oxide was added, and the mixture heated to 160°C. Propylene oxide was added incrementally, maintaining the pressure between 25 and 100 psig. The temperature was maintained at 160°–180°C. After four hours the reaction mixture was cooled and 570 g. of a light brown, liquid product was removed from the autoclave, indicating the isocyanurate: propylene oxide mol ratio of the product was 1:5. The product had 9.0% of —OH groups, a hydroxyl number of 297, a pH of 6, viscosity of 7000 cps. and a water content of 0.72%. This compound had the formula

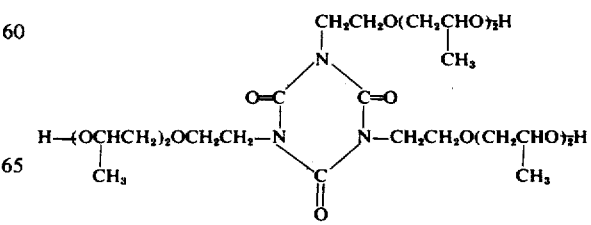

EXAMPLE VII

The procedure of Example VI was followed utilizing 350 g.of tris(2-hydroxyethyl)isocyanurate, 350 ml of propylene oxide and 1.0 g. of concentrated sulfuric acid.

610 Grams of a light yellow product having 11.9% —OH, a hydroxyl number of 392, viscosity of 9000 cps, pH 6, and water content of 0.22% was obtained. The product had the formula

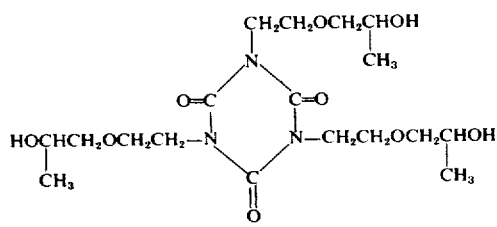

EXAMPLE VIII

The procedure of Example VI was followed utilizing 390 g. tris(2-hydroxyethyl)isocyanurate, 0.8 g. concentrated sulfuric acid and 315 ml propylene oxide.

564 Grams of a light yellow product having 13.7% -OH, hydroxyl number of 443, viscosity of 19,000 cps, pH 6, and water content of 0.55% was obtained. The product had the formula

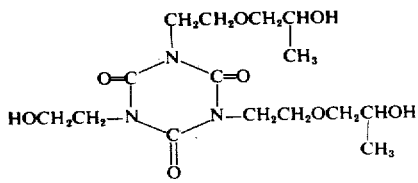

EXAMPLE IX

The procedure of Example VI was followed utilizing 341 g. tris(2-hydroxyethyl)isocyanurate, 290 ml propylene oxide and 1 g. concentrated sulfuric acid.

566 Grams of a light yellow product having 10.0% —OH, hydroxyl number 329, viscosity of 8000 cps, pH 6 and water content of 0.4% was obtained. This product had the formula

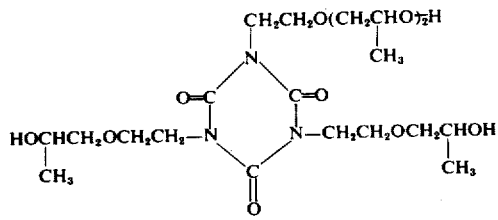

EXAMPLE X

The procedure of Example I is repeated wherein 3 moles of ethylene oxide are reacted with one mole of tris(2-hydroxyethyl)isocyanurate to afford tris(hydroxyethyloxyethyl)isocyanurate. To the contents of the reaction vessel is added 45 ml. of Solvesso 100, 25 ml. of xylol and 1.0 g. of tetraisopropyl titanate. Dimethyl terephthalate (129 g.) is then charged into the vessel and the mixture is heated to about 180°C. for a period of 5 hours. The resulting polyester is isolated by stripping solvent and cooling to room temperature. The polyester is soluble in cresylic acid.

EXAMPLE XI

Wire Enamel

The procedure of Example II is repeated wherein the following reaction mixture is used:

| | |
|---|---|
| Tris(hydroxyethyloxyethyl)-isocyanurate (as in Example II), g. | 262 |
| Ethylene glycol, g. | 60 |
| 1,4-Butanediol, g. | 34 |
| Dimethyl terephthalate, g. | 340 |
| Litharge, g. | 0.15 |
| Solvesso, ml. | 80 |
| Xylol, ml. | 35 |

After reaction, the product is reduced to about 50% resin solids with cresylic acid.

A wire enamel is prepared by mixing 239 grams of the cresylic acid composition, 39 grams of Mondur SH, 124 grams of cresylic acid, 130 grams of Solvesso 100 and 8.4 grams of 9% zinc octoate in E.W. naphtha. This wire enamel is applied on 18 gauge copper wire.

EXAMPLE XII

Insulating Varnishes

A. Oil-Modified Alkyd

Coconut oil (427 g., 1.86 moles) and glycerol (138 g., 1.5 mole) are charged into a resin kettle, which is then heated, stirred and sparged with nitrogen (0.5 cubic feet per hour). When the temperature reaches 180°C., 2 g. of 0.5% calcium naphthanate is added. The temperature is then increased to 240°C. and the alcoholysis continued until the monoglyceride has compatibility with methanol greater than 3:1.

The reaction temperature is reduced to 180°C. and phthalic anhydride (547 g., 3.7 moles), maleic anhydride (20 g., 0.204 mole), and glycerol (175 g., 1.9 mole) are added to the kettle. Ten minutes after the temperature reaches 180°C., tris(hydroxyethyloxyethyl)isocyanurate (118 g., 0.3 mole), prepared as in Example II, is added and the temperature is then raised to 230°–240°C. The esterification is continued until the acid number (solid basis) reached the range of 6–12, and the viscosity at 60% solids in xylene ranges from $Z_2$–$Z_4$.

The temperature is then lowered to 180°C. and the resin reduced to 60% solids in xylene.

B. Varnishes

A blend consisting of 70% of the alkyd of Part A and 30% of a butylated melamine-formaldehyde resin(Plaskon 3385) is prepared and formed into a film of 1.5–2.0 mil thickness by curing for 30 minutes at 95°C. This film is compared with a similarly prepared film in which the alkyd resin has not been modified with the tris(hydroxyethyloxyethyl)-isocyanurate.

| Film Properties | Modified Alkyd | Unmodified Alkyd |
|---|---|---|
| Sward Hardness | 38 | 30 |
| Impact Resistance | | |
| Front | 75 in. lb. | 36 in. lb. |
| Back | 60 in. lb. | 4 in. lb. |
| Gloss | 100+ | 100 |

A blend consisting of 84% of the alkyd of Part A and 16% of the phenolic-formaldehyde resin as prepared in Example X of U.S. Patent 3,312,645 is prepared to afford an insulating varnish.

EXAMPLE XIII

Ester-Imide Copolymers

A. Imide-Containing Reactant

Commercial cresol (1100 g.) is placed in a reaction vessel equipped with a stirrer and thermometer, and the temperature is raised to 150°C. Trimellitic anhydride (230 g.) is added incrementally until it is completely dissolved, and then 119 g. of 4,4'-diaminodiphenylmethane is introduced. Heating is continued for 8 hours at 140°–150°C., and then the reaction mixture is cooled. The resulting precipitate is recovered by filtration to afford the desired imide ring-containing product which is washed with alcohol and ether, then dried.

B. Ester-Imide Copolymer

The following blend is charged into a resin kettle equipped with stirrer, distillation condenser and thermometer:

| | |
|---|---|
| Tris(hydroxyethyloxyethyl)isocyanurate (as in Example II), g. | 242 |
| Ethylene glycol, g. | 305 |
| Dimethyl terephthalate, g. | 780 |
| Litharge, g. | 0.3 |
| Solvesso 100, ml. | 100 |
| Xylol, ml. | 180 |

The mixture is heated to 210°C. over a 7½ hour period and then vacuum is applied to remove the residual water of condensation and solvents. The temperature is then adjusted to 175°C. and 140 g. of the imide ring-containing product of Part A is added. The temperature is then raised to 185°C. and when the imide is nearly taken up by the polyester, an additional 140 g. of imide product is slowly added while raising the temperature to 218°C. Then 3 g. of cadmium acetate is added and the reaction is continued for an additional 3 hours at 215°–220°C., and finally under vacuum. The resulting ester-imide resin is then dissolved in 870 g. of commercial cresol and a solution of 16 g. of butyl titanate in 30 g. of cresol is added. The resulting lacquer is diluted with a mixture of solvent naphtha and cresol until resin solids content is 30%.

EXAMPLE XIV

Unsaturated Polyester

Tris(hydroxyethyloxyethyl)isocyanurate (786 g., 2 moles), prepared by reaction of tris-(2-hydroxyethyl)isocyanurate with a 3-fold molar excess of ethylene oxide as in Example II, is polyesterified with maleic anhydride (608.4 g., 6.20 moles), phthalic anhydride (918.8 grams, 6.21 moles), propylene glycol (783 g., 10.3 moles), and hydroquinone (1.00 g., 0.02 weight % on charge weight). The temperature is then raised to 210°C., the mixture stirred at 350 RPM, and a nitrogen sparge rate of 1.5–2.0 standard cubic feet per hour maintained. When the acid number falls to below 50, the overhead is set for total take-off of volatiles, and 0.75 g. of hydroquinone (0.15 wt. % on charge) added. After 5½ hours at 210°C., the product is cooled to 160°C. and dumped into tared aluminum trays.

EXAMPLE XV

High-Impact Type Alkyd Molding Compound

The following formulation is used to prepare a high-impact type alkyd molding compound:

| Material | Weight, g. |
|---|---|
| Polyester of Example VI | 408 |
| Diallyl Phthalate (DAP) Monomer | 67 |
| 50% Benzoyl Peroxide in Tricresyl Phosphate | 28 |
| Phenolic Oil Stabilizer | 0.8 |
| Aluminum Silicate Pigment Filler | 585 |
| BaCO$_3$ | 98 |
| Stearic Acid | 19 |
| 622 ½" Glass | 618 |
| Mapico Black Pigment | 20 |
| Total = | 1843.8 |

The polyester is dissolved, with agitation, in methylene chloride in a 1 gallon can. Catalyst, stabilizer, monomer, and pigment are then added. After addition of the filler and barium carbonate, a solution of stearic acid in methylene chloride is added, and the slurry is rapidly stirred for about 15 minutes to obtain a uniform dispersion. The slurry is then poured onto the glass in a Hobart mixer, and the mixture is stirred to uniformly coat the glass with the slurry. The compound is spread out on large boards to dry overnight to remove the solvent. A charge of 460 g. is used to mold a 10 × 10 inch panel under a pressure of 75 tons on a 10¼ inch ram for 5 minutes at 300°F.

We claim:

1. A polyester comprising the reaction product of a dicarboxylic acid and an isocyanurate of the formula

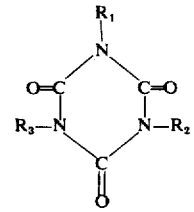

wherein R$_1$ is a hydrogen-terminated oxyalkylene chain of from 2 to 30 oxyalkylene units, and R$_2$ and R$_3$ are each of hydrogenterminated oxyalkylene chain of from 1 to 30 oxyalkylene units, wherein each oxyalkylene unit has the formula —CH$_2$,CHO—
wherein R at each occurrence independently is hydrogen, methyl or ethyl.

2. A polyester according to claim 1 wherein said isocyanurate has the formula

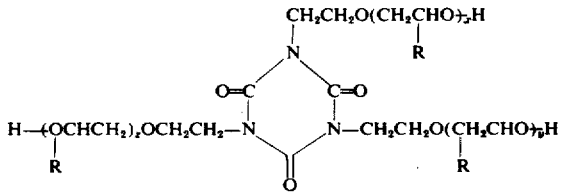

wherein R is according to claim 1, x is an integer from 1 to 29 and y and z are integers from 0 to 29.

3. A polyester according to claim 1 wherein x is 1–3 and y and z are 0–3.

4. A wire enamel insulating composition comprising a polyester according to claim 1 and from about 0.1 to 15% by weight of an organic polyisocyanate.

5. A wire enamel insulating composition comprising a polyester according to claim 2 and from about 0.1 to 15% by weight of an organic polyisocyanate.

6. A wire enamel insulating composition comprising a polyester according to claim 3 and 0.1 to 15% by weight of an organic polyisocyanate.

7. An unsaturated polyester comprising the reaction product of an unsaturated dicarboxylic acid or anhydride thereof and an isocyanurate of the formula

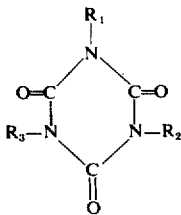

wherein $R_1$ is a hydrogen-terminated oxyalkylene chain of from 2 to 30 oxyalkylene units, and $R_2$ and $R_3$ are each a hydrogen-terminated oxyalkylene chain of from 1 to 30 oxyalkylene units, wherein each oxyalkylene unit has the formula —$CH_2CHO$—
wherein R at each occurrence independently is hydrogen, methyl or ethyl, a cross-linking monomer and a cross-linking initiator.

8. A polyester-polyimide which is the reaction product of a polyester of claim 1 and a polyimide wherein the polyimide is the reaction product of reactants comprisng a) an aromatic carboxylic anhydride containing at least one further reactive group selected from the group consisting of a carboxyl, a carboxylic anhydride or a hydroxyl group and b) a primary amine containing at least one further reactive group selected from the group consisting of a carboxyl, a hydroxyl or a primary amino.

9. An oil modified polyester comprising the reaction product of (1) a dicarboxylic acid, (2) an isocyanurate of the formula

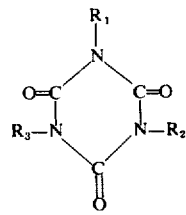

wherein $R_1$ is a hydrogen-terminated oxyalkylene chain of from 2 to 30 oxyalkylene units, and $R_2$ and $R_3$ are each a hydrogen-terminated oxyalkylene chain of from 1 to 30 oxyalkylene units, wherein each oxyalkylene unit has the formula

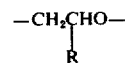

wherein R at each occurrence independently is hydrogen, methyl or ethyl and (3) one or more members of the groups consisting of fatty acids and oils.

10. An oil modified polyester according to claim 9 wherein said isocyanurate has the formula

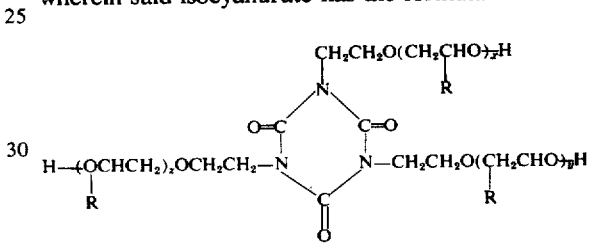

wherein R is according to claim 20, $x$ is an integer from 1 to 29 and $y$ and $z$ are integers from 0 to 29.

11. An oil modified polyester according to claim 9 wherein $x$ is 1–3 and $y$ and $z$ are 0–3.

12. An oil modified polyester according to claim 9 additionally containing 10 to 80% by weight of an oil soluble phenol-formaldehyde resin, based on the total weight of the oil modified polyester and phenol-formaldehyde resin.

13. An insulating varnish comprising the oil modified polyester of claim 9 and a solvent.

* * * * *

UNITED STATES PATENT AND TRADEMARK OFFICE
CERTIFICATE OF CORRECTION

PATENT NO. : 3,919,144
DATED : November 11, 1975
INVENTOR(S) : Robert L. Formaini and Edwin D. Little It is certified that error appears in the above-identified patent and that said Letters Patent are hereby corrected as shown below:

Column 1, line 14 "$\beta$-hydroxyalkyl)" should be --($\beta$-hydroxyalkyl)--.

Column 1, line 57, that portion of the formula: "$CH_2CH_2O(CH_2CHO)_xH$"

should read -- $CH_2CH_2O(CH_2CHO)_xH$ --.
$\phantom{should read -- CH_2CH_2O(CH_2C}|$
$\phantom{should read -- CH_2CH_2O(CH_2C}R$ Column 14, line 30 "$(CH_2CH_2)_aH$" should read --$(CH_2CH_2O)_aH$--.

Column 18, line 48 "hydrogenterminated" should read -- hydrogen-terminated --.

Column 18, line 50 " $-CH_2,CHO-$ " should read -- $-CH_2CHO-$ --.
$\phantom{Column 18, line 50 " -CH_2,CHO- " should read -- -CH_2}|$
$\phantom{Column 18, line 50 " -CH_2,CHO- " should read -- -CH_2}R$ Column 18, line 61, that portion of the formula:

"$H-(OCHCH_2)_zOCH_2CH_2-N \qquad N-CH_2CH_2O(CH_2CHO)_yH$" should read
$\phantom{"H-(O}R \phantom{CHCH_2)_zOCH_2CH_2-N \qquad N-CH_2CH_2O(C}R$ -- $H-(OCHCH_2)_zOCH_2CH_2-N\phantom{xx}N-CH_2CH_2O(CH_2CHO)_yH$ --.
$\phantom{-- H-(O}|\phantom{CHCH_2)_zOCH_2CH_2-N}\diagdown\phantom{x}\diagup\phantom{N-CH_2CH_2O(C}|$
$\phantom{-- H-(O}R\phantom{CHCH_2)_zOCH_2CH_2-Nxxxx}C\phantom{xxxxN-CH_2CH_2O(C}R$
$\phantom{-- H-(OCHCH_2)_zOCH_2CH_2-Nxxxx}\|$
$\phantom{-- H-(OCHCH_2)_zOCH_2CH_2-Nxxxx}O$

UNITED STATES PATENT AND TRADEMARK OFFICE
CERTIFICATE OF CORRECTION

PATENT NO. : 3,919,144
DATED : November 11, 1975
INVENTOR(S) : Robert L. Formaini and Edwin D. Little It is certified that error appears in the above—identified patent and that said Letters Patent are hereby corrected as shown below:

Column 19, line 30 "-$CH_2CHO$-" should read -- -$CH_2\underset{\underset{R}{|}}{C}HO$- --.

Column 20, line 31, that portion of the formula

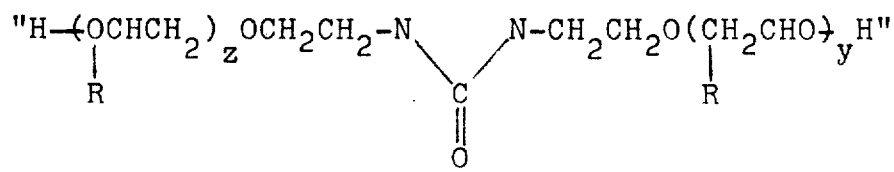

should read

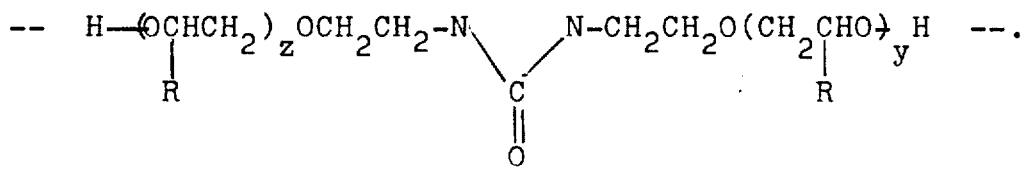

Column 20, line 36 "claim 20" should read --claim 9--.

Signed and Sealed this sixteenth Day of March 1976

[SEAL]

Attest:

RUTH C. MASON
Attesting Officer

C. MARSHALL DANN
Commissioner of Patents and Trademarks